US007429408B2

(12) United States Patent
Kawasaki et al.

(10) Patent No.: US 7,429,408 B2
(45) Date of Patent: Sep. 30, 2008

(54) METHOD FOR PREPARING CALCIUM ALUMINATE FILM CONTAINING OXYGEN RADICAL AND LAMINATE

(75) Inventors: Takashi Kawasaki, Tokyo (JP); Kazuhiro Ito, Tokyo (JP); Masahiro Ibukiyama, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 228 days.

(21) Appl. No.: 10/542,779

(22) PCT Filed: Jan. 21, 2004

(86) PCT No.: PCT/JP2004/000473

§ 371 (c)(1),
(2), (4) Date: Dec. 29, 2005

(87) PCT Pub. No.: WO2004/065301

PCT Pub. Date: Aug. 5, 2004

(65) Prior Publication Data

US 2006/0216541 A1  Sep. 28, 2006

(30) Foreign Application Priority Data

Jan. 21, 2003 (JP) ............... 2003-012363
Aug. 22, 2003 (JP) ............... 2003-298139

(51) Int. Cl.
*C23C 4/10* (2006.01)
(52) U.S. Cl. ............... 427/453; 423/115; 424/688
(58) Field of Classification Search ............... 428/215, 428/220, 323; 427/453
See application file for complete search history.

(56) References Cited

U.S. PATENT DOCUMENTS 4,695,595 A * 9/1987 Blount ............... 521/99
5,391,440 A * 2/1995 Kuo et al. ............... 429/27
5,463,171 A * 10/1995 Nishi et al. ............... 588/4
5,480,438 A * 1/1996 Arima et al. ............... 623/23.6
6,376,057 B1 * 4/2002 Akao et al. ............... 428/215
2002/0172726 A1 * 11/2002 Hosono et al. ............... 424/688
2002/0177003 A1 * 11/2002 Myrick ............... 428/469
2005/0061657 A1 * 3/2005 Hosono et al. ............... 204/164

FOREIGN PATENT DOCUMENTS

| JP | 7-69759 | 3/1995 |
| JP | 2002-3218 | 1/2002 |
| JP | 2002-146346 | 5/2002 |
| JP | 2002-316867 | 10/2002 |
| JP | 2003-128415 | 5/2003 |
| JP | 2003-226571 | 8/2003 |
| WO | WO 03/050037 A1 | 6/2003 |

OTHER PUBLICATIONS htt://www.astaxanthin.org/oxidation.htm, published Oct. 18, 2000.*
J. H. Lunsford: "ESR of Adsorbed Oxygen Species", Catalysis Reviews, vol. 8, No. 1, pp. 135-157, 1973.
M. Che; A. J. Tench: "Characterization and Reactivity of Molecular Oxygen Species on Oxide Surfaces", Advances in Catalysis, vol. 32, pp. 1-148, 1983.
Von Hans Bartl; Thomas Scheller: "Zur Struktur des 12CaO·7Al2O3", Neues Jarbuch f. Mineralogle. Monatshefte, pp. 547-552, 1970.
Hideo Hosono; Yoshihiro Abe: "Occurence of Superoxide Radical Ion in Crystalline 12CaO·7Al2O3 Prepared via Solid-State Reactions", Inorg. Chem., vol. 26, pp. 1192-1195, 1987.

* cited by examiner

*Primary Examiner*—Katherine A Bareford
(74) *Attorney, Agent, or Firm*—Oblon, Spivak, McClelland, Maier & Neustadt, P.C.

(57) ABSTRACT

$C_{12}A_7$ containing oxygen radicals at a high concentration, is provided at a low cost. A method for preparing an oxygen radical-containing calcium aluminate film, characterized in that it comprises subjecting a powder of oxygen radical-containing calcium aluminate to thermal spraying, and preferably the oxygen radical content in the oxygen radical-containing calcium aluminate is at least $10^{20}$ cm$^{-3}$.

7 Claims, No Drawings

METHOD FOR PREPARING CALCIUM ALUMINATE FILM CONTAINING OXYGEN RADICAL AND LAMINATE

TECHNICAL FIELD

The present invention relates to a calcium aluminate film containing oxygen radicals such as $O_2^-$ or $O^-$ as active oxygen species, at a high concentration, which is expected to be useful for an application as e.g. an oxidation catalyst or an ion conductor, and its laminate.

BACKGROUND ART

Oxygen radicals such as $O_2^-$ or $O^-$ are one type of active oxygen, and they are known to perform an important role in the oxidation process of organic substances or inorganic substances. A wide range of researches have been conducted with respect to $O_2^-$ adsorbed on a solid surface of an oxide compound (J. H. Lunsford, Catal. Rev. 8, 135, 1973, M. Che and A. J. Tench, adv. Catal, 32, 1, 1983).

In such researches, $O_2^-$ is prepared by irradiating the surface of an oxide compound with high energy radiation such as γ-rays.

As crystals containing $O_2^-$ as constituting anions, $RO_2$ (R=alkali metal) are known, but each of these compounds will readily undergo decomposition at a low temperature of at most 300° C. and can not be used for an application as e.g. an oxidation catalyst or an ion conductor.

In 1970, H. B. Bartl et al stated that in $12CaO \cdot 7Al_2O_3$ (hereinafter referred to as $C_{12}A_7$) crystal, among 66 pieces of oxygen present in a unit cell containing two molecules, two pieces are not contained in the network and present as "free oxygen" in a space in a cage present in the crystal (H. B. Bartl and T. Scheller, Neues Jarhrb. Mineral., Monatsh. 1970, 547).

Further, Hosono et al discovered from an electron spin resonance measurement that about $1 \times 10^{19}/cm^3$ of $O_2^-$ are included in $C_{12}A_7$ crystal synthesized by a solid phase reaction in air at a temperature of 1,200° C. using $CaCO_3$ and $Al_2O_3$ or $Al(OH)_3$ as starting materials, and have proposed a model such that some of free oxygen are present in a cage in the form of $O_2^-$ (H. Hosono and Y. Abe, Inorg. Chem. 26, 1193, 1987).

$C_{12}A_7$ is a stable oxide having a melting point of 1,415° C., and it is expected to be useful as an oxidation catalyst, an ion conductor or the like, if it becomes possible to increase the amount of $O_2^-$ to be included, so that reversible taking in and discharge will be possible.

Hosono et al. further conducted a study on the above $C_{12}A_7$ including $O_2^-$, and obtained $C_{12}A_7$ including $O_2^-$ and $O^-$ as active oxygen species at a high concentration of at least $10^{20}/cm^3$, by using $CaCO_3$, $Ca(OH)_2$ or CaO, and $Al_2O_3$ or $Al(OH)_3$, as starting materials and firing them in a dry oxidizing atmosphere with an oxygen partial pressure of at least $10^4$ Pa and a steam partial pressure of at most $10^2$ Pa at a temperature of at least 1,20° C. and less than 1,415° C. to carry out a solid phase reaction (JP-A-2002-3218).

DISCLOSURE OF THE INVENTION

However, when it is desired to industrially utilize $C_{12}A_7$ containing active oxygen species at a high concentration, found by Hosono et al, there is still a problem to be solved.

Namely, when $C_{12}A_7$ containing oxygen radicals at a high concentration, is to be used for an application as e.g. an oxidation catalyst or an ion conductor, it is required to be made into various forms suitable for the respective applications in order to let it provide sufficient functions depending upon the particular applications.

Except for a case where $C_{12}A_7$ is used in a powder form, it is common to impart a particular form by sintering $C_{12}A_7$. Such a sintered body can be produced by molding a $C_{12}A_7$ powder, or a mixed powder of a calcium compound and an aluminum compound, as the starting material, into a prescribed shape by means of a mold or the like, followed by firing. However, when a large sized product such as a plate product having a large area, is to be produced, a large scale molding machine or firing furnace will be required, which makes the product expensive.

As an idea to solve such a problem, it is conceivable to form a film of $C_{12}A_7$ which can relatively easily be made to have a large area. As a specific method for forming such a film, a physical vapor deposition (PVD) method such as a sputtering method or a laser abrasive method, a sol-gel method, or a chemical vapor deposition (CVD) method may, for example, be mentioned, but each of such methods has a problem.

Namely, a $C_{12}A_7$ film obtained by the PVD method or the sol-gel method, is amorphous and can not include oxygen radicals as it is. In order to convert it to crystalline $C_{12}A_7$ which is capable of including oxygen radicals at a high concentration, it is necessary to subject it to thermal treatment at a high temperature of at least 1,000° C. after the film formation.

By the CVD method, it is possible to directly form crystalline $C_{12}A_7$, but the substrate is required to be maintained at a high temperature of at least 1,000° C. Accordingly, unless the thermal expansion coefficients of the $C_{12}A_7$ film and the substrate agree to each other, the film tends to be peeled from the substrate during cooling, or the film tends to undergo cracking.

As mentioned above, in the conventional method, the substrate to obtain a crystalline $C_{12}A_7$ film capable of including oxygen radicals at a high concentration, is required to be durable at a high temperature of at least 1,000° C., not to react with $C_{12}A_7$ at a high temperature and to have a thermal expansion coefficient which agrees to $C_{12}A_7$, and thus, the material for the substrate is substantially limited.

The present inventors have found that the above-mentioned problem which the $C_{12}A_7$ sintered body, particular the $C_{12}A_7$ film, has, can be solved by using a film-forming method so-called a thermal spraying method and further that a laminate excellent in an oxygen ion conductivity can be easily obtainable with high reproducibility, and thus have arrived at the present invention.

Namely, the present invention provides the following:

(1) A method for preparing an oxygen radical-containing calcium aluminate film, characterized in that it comprises subjecting a powder of oxygen radical-containing calcium aluminate to thermal spraying.

(2) The method according to the above (1), wherein the oxygen radical content in the oxygen radical-containing calcium aluminate is at least $10^{20}$ cm$^{-3}$.

(3) The method according to the above (1) or (2), wherein the main mineral phase in the powder of oxygen radical-containing calcium aluminate is crystalline $12CaO \cdot 7Al_2O_3$ ($C_{12}A_7$).

(4) The method according to the above (3), wherein the $12CaO \cdot 7Al_2O_3$ ($C_{12}A_7$) is obtained by a solid phase reaction of a Ca source and an Al source in a mol ratio of Ca:Al being from 0.77:1 to 0.96:1.

(5) The method according to the above (4), wherein the solid phase reaction is carried out in a dry oxidizing atmosphere having an oxygen partial pressure of at least $10^4$ Pa, a steam partial pressure of at most $10^2$ Pa and a temperature of from 1,200 to 1,415° C., or after the solid phase reaction, the system is maintained in such a dry oxidizing atmosphere.

(6) The method according to any one of the above (1) to (5), wherein the thermal spraying is carried out by plasma spraying.

(7) A laminate having an oxygen radical-containing calcium aluminate film formed on a substrate, characterized in that the oxygen radical-containing calcium aluminate film is formed by subjecting a powder of oxygen radical-containing calcium aluminate to thermal spraying.

(8) The laminate according to the above (7), wherein the oxygen radical-containing calcium aluminate film has a thickness of from 5 to 200 μm.

(9) The laminate according to the above (7) or (8), wherein the oxygen radical content in the oxygen radical-containing calcium aluminate is at least $10^{20}$ cm$^{-3}$.

(10) The laminate according to any one of the above (7) to (9), wherein the substrate is a sintered body of zirconium oxide.

According to the present invention, a calcium aluminate powder already containing oxygen radicals at a high concentration is used as a starting material, and such a material is subjected to thermal spraying, whereby a calcium aluminate film containing oxygen radicals at a high concentration will be obtained, and it is possible to easily provide with high reproducibility an oxygen radical-containing calcium aluminate film having a large area or a complicated shape, depending upon the particular application, such being industrially very useful.

In addition, according to the present invention, a laminate will be presented wherein a calcium aluminate film containing oxygen radicals at a high concentration, is formed on the surface of a substrate having a desired shape and properties, and such a laminate is suitable for an application as e.g. an oxidation catalyst or an ion conductor and thus is industrially useful.

BEST MODE FOR CARRYING OUT THE INVENTION

The present invention provides a method for preparing an oxygen radical-containing calcium aluminate film, characterized in that it comprises subjecting a powder of oxygen radical-containing calcium aluminate to thermal spraying, wherein the oxygen radical content in the oxygen radical-containing calcium aluminate is preferably at least $10^{20}$ cm$^{-3}$, particularly preferably at least $2\times10^{20}$ cm$^{-3}$.

As a result of various studies on a method for obtaining an oxygen radical-containing calcium aluminate, the present inventors have found that when a calcium aluminate powder is used as a starting material powder and subjected to thermal spraying, a calcium aluminate film can be obtained, and at that time, the crystallinity of the calcium aluminate powder is substantially maintained, and by utilizing such a nature, by using a calcium aluminate powder already containing oxygen radicals, it is possible to obtain an oxygen radical-containing calcium aluminate, whereby the above-mentioned problem of the prior art can be solved all at once. Thus, the present invention is based on such a discovery.

In the present invention, the calcium aluminate is constituted by Ca, Al and O (oxygen) as the main elements, and its main mineral phase is crystalline $12CaO\cdot7Al_2O_3(C_{12}A_7)$. The calcium aluminate may further contain mineral phases such as $3CaO\cdot Al_2O_3(C_3A)$, $CaO\cdot Al_2O_3$ (CA), $CaO\cdot2Al_2O_3$ ($CA_2$) and $CaO\cdot6Al_2O_3(CA_6)$. However, only crystalline $C_{12}A_7$ has a nature to include oxygen radicals at a high concentration of preferably at least $10^{20}$ cm$^{-3}$, particularly preferably at least $2\times10^{20}$ $^{-3}$.

In order to make the main component of the calcium aluminate to be $C_{12}A_7$, the molar ratio of Ca:Al contained in the Ca source and the Al source as the starting materials, is adjusted to be preferably from 0.77:1 to 0.96:1, particularly preferably from 0.81:1 to 0.90:1. If the molar ratio of Ca:Al is outside the above range, the amounts of $C_3A$ and CA being calcium aluminates other than $C_{12}A_7$, tend to be large, whereby the nature to include oxygen radicals will be impaired, such being undesirable.

The calcium aluminate powder to be used in the present invention may be obtained from various materials, so that the above blend ratio can be attained. The Ca source to be used as such a starting material, may, for example, be limestone ($CaCO_3$), slaked lime ($Ca(OH)_2$) or quick lime (CaO). Further, the Al source may, for example, be alumina ($Al_2O_3$), aluminum hydroxide ($Al(OH)_3$), bauxite or aluminum residual ash. Among them, it is possible to use $CaCO_3$ and $Al_2O_3$ particularly preferably, since they are readily available and highly safe.

Calcium aluminate including oxygen radicals at a high concentration of preferably at least $10^{20}$ cm$^{-3}$, particularly preferably at least $2\times10^{20}$ cm$^{-3}$, can be obtained by mixing the Ca source and the Al source, followed by a solid phase reaction under a condition having the atmosphere and the temperature controlled, or by a solid phase reaction, followed by maintaining the system under a condition having the atmosphere and the temperature controlled, preferably for from 1 to 10 hours. The above-mentioned condition having the atmosphere and the temperature controlled, may, for example, be a dry oxidizing atmosphere having an oxygen partial pressure of preferably at least $10^4$ Pa, particularly preferably at least $1\times10^4$ Pa, a steam partial pressure of preferably at most $10^2$ Pa, particularly preferably at most 50 Pa, and a temperature of preferably from 1,200 to 1,415° C., particularly preferably from 1,250 to 1,370° C.

The calcium aluminate including oxygen radicals at a high concentration, thus obtained, may be adjusted to a particle size of preferably from 10 to 100 μm, particularly preferably from 10 to 50 μm, by a method such as pulverization or sieving, thereby to obtain a powder suitable as a starting material for thermal spraying.

The thermal spraying method in the present invention may be any method such as a plasma spraying method, a flame spraying method, an explosion spraying method or a laser spraying method. However, a plasma spraying method is particularly preferred, which is excellent in the uniformity of the film and the adhesion between the film and the substrate and which is excellent also in the safety and economical efficiency.

The reason as to why in the present invention, a calcium aluminate film including oxygen radicals at a high concentration can be satisfactorily obtained by such a thermal spraying method, is not necessarily clearly understood, but the present inventors consider that the reason is as follows. Namely, in a common thermal spraying apparatus to be used for thermal spraying, when the starting material such as a powder is transported to a site so-called a spray gun, it is heated to a high temperature by a plasma or flame, whereby at least the surface becomes a liquid, which will be continuously jetted from the forward end of the spray gun and will be solidified after being deposited on the substrate surface, to form a film.

The calcium aluminate film obtained by the thermal spraying method according to the present invention, has a thickness of preferably from 5 to 200 μm, particularly preferably from 50 to 150 μm, and as is different from the film obtainable by the PVD method, the sol-gel method or the CVD method, it is crystalline in spite of the fact it is formed without heating the substrate. This is attributable to the fact that as is different from the case of the PVD method, the sol-gel method or the CVD method, the starting material in the thermal spraying method, will not undergo a remarkable state change by evaporation or a chemical reaction and will simply be melted at the surface or in the vicinity thereof by a high temperature and thereafter solidified on the substrate, whereby the composition and the crystal structure of the starting material are likely to be reflected to the film as they are.

Further, the present invention provides a laminate having an oxygen radical-containing calcium aluminate film formed on a substrate, characterized in that the oxygen radical-containing calcium aluminate film is formed by subjecting a powder of oxygen radical-containing calcium aluminate to thermal spraying, wherein the substrate is preferably a sintered body of zirconium oxide.

In the present invention, a crystalline calcium aluminate film can be obtained without heating the substrate, and yet, a thermal spraying method is adopted. Accordingly, the material for the substrate is not restricted by the heat resistance, the reactivity or the thermal expansion coefficient and can be selected within a wide range, and various laminates can be obtained. Therefore, not only a ceramic substrate, but also a metal or glass substrate which has been difficult to use, for example, in the PVD method, the sol-gel method or the CVD method, may be used. Further, by moving the spray gun at the time of thermal spraying, deposition on a substrate having a large area or on a substrate having a curved surface can easily be carried out. To the substrate, pretreatment for surface roughening may be applied, as the case requires, in order to improve the adhesion with the film.

As a preferred embodiment of the present invention, a laminate may be mentioned wherein a sintered body made of zirconium oxide is used as the substrate. This laminate may be employed suitably as an ion source which provides oxygen radicals or oxygen ions, since a highly concentrated oxygen radical-containing calcium aluminate film is formed on the surface of the sintered body of zirconium oxide wherein movement of oxygen ions is possible under a high temperature condition (about 750° C.). Here, the sintered body of zirconium oxide ($ZrO_2$, which may also be referred to as zirconia) in the present invention includes not only a sintered body of zirconia alone, but also a sintered body of zirconia stabilized by yttrium oxide ($Y_2O_3$, which may also be referred to as yttria) or calcium oxide (CaO, which may also be referred to as calcia).

EXAMPLES

Now, the present invention will be described in further detail with reference to Examples and Comparative Examples. However, it should be understood that the present invention is by no means restricted to such Examples.

Example 1

A calcium carbonate ($CaCO_3$) powder and an alumina ($\gamma$-$Al_2O_3$) powder were mixed so that the molar ratio of Ca to Al would be 0.82:1, followed by firing in the atmospheric air at 1,300° C. for 3 hours to obtain a white powder. After cooling, the X-ray diffraction measurement was carried out, and this powder was confirmed to be $C_{12}A_7$.

Further, the above powder was fired in a dry oxidizing atmosphere having an oxygen partial pressure of $4 \times 10^4$ Pa and a steem partial pressure of $10^2$ Pa, at 1,250° C. for two hours. After cooling, the ESR spectra at room temperature and at 77 K were measured, and the concentrations of $O_2^-$ ion radicals and $O^-$ ion radicals were obtained from the intensities of the respective absorption bands, and they were, respectively, $5 \times 10^{20}$ cm$^{-3}$ (hereinafter, this powder will be referred to as "oxygen radical-containing $C_{12}A_7$ powder")

The above oxygen radical-containing $C_{12}A_7$ powder was pulverized and sieved to obtain a powder of from 10 to 100 μm, which was loaded on a plasma spraying machine. As the plasma gas, a gas mixture of argon and hydrogen was used, and thermal spraying was carried out under conditions of a current value of 500 A, a voltage value of 64 V and a spraying distance of 100 mm on a substrate made of steel having the surface roughened by blast treatment with $Al_2O_3$ blast material of #54.

The obtained sprayed coating film was confirmed to have a thickness of about 150 μm and to be closely bonded to the substrate without clearance, by a scanning electron microscope (SEM). Further, by the X-ray diffraction measurement, it was confirmed to be crystalline $C_{12}A_7$. Further, the film was peeled from the substrate and its ESR spectra were measured, whereby the concentrations of $O_2^-$ ion radicals and $O^-$ ion radicals were obtained and found to be $4 \times 10^{20}$ cm$^{-3}$, respectively.

Example 2

The oxygen radical-containing $C_{12}A_7$ powder of Example 1 was pulverized and sieved to obtain a powder of from 1 to 50 μm, which was loaded on a plasma spraying machine, and then, thermal spraying was carried out under the same conditions as in Example 1 on a substrate having one side of an yttria ($Y_2O_3$) stabilized zirconia ($ZrO_2$) disk having a diameter of 25 mm and a thickness of 2.8 mm (YSZ-8, manufactured by NIKKATO CORPORATION) subjected to blast treatment.

The obtained sprayed coating film was confirmed to have a thickness of about 100 μm, to be closely bonded to the substrate without clearance, to be crystalline $C_{12}A_7$ and to have concentrations of $O_2^-$ ion radicals and $O^-$ ion radicals being $5 \times 10^{20}$ cm$^{-3}$, respectively, by the same operations as in Example 1.

Example 3

Thermal spraying was carried out in the same manner as in Example 2 except that in Example 2, instead of the disk, a cylindrical yttria stabilized zirconia having an outer diameter of 17 mm, an inner diameter of 13 mm and a length of 300 mm (YSZ-8, manufactured by NIKKATO CORPORATION) was used, and employed as a substrate by subjecting the outer surface to blast treatment, and the sprayed coating film was confirmed to have a thickness of about 120 μm, to be closely bonded to the substrate without clearance, to be crystalline $C_{12}A_7$ and to have concentrations of $O_2^-$ ion radicals and $O^-$ ion radicals being $4 \times 10^{20}$ cm$^{-3}$, respectively. Further, this film was operable as an ion source for oxygen ions at 750° C.

Comparative Example

In the same manner as in Example 1, a $C_{12}A_7$ powder containing $5 \times 10^{20}$ cm$^{-3}$ of each of $O_2^-$ ion radicals and $O^-$ ion radicals, was prepared, then molded by a mold and further fired in a dry oxidizing atmosphere having an oxygen partial pressure of $4\times10^4$ Pa and a steam partial pressure of $10^{20}$ Pa at 1,390° C. for two hours to obtain a sintered body. A part of the sintered body was pulverized and then confirmed to be $C_{12}A_7$ by the X-ray diffraction measurement. Further, the concentrations of $O_2^-$ ion radicals and $O^-$ ion radicals obtained by the ESR spectra were $6\times10^{20}$ cm$^{-3}$, respectively. The rest of this sintered body was processed to prepare a disk having a diameter of 50 mm and a thickness of 5 mm.

Using this disk as a target, a sputter deposition film having a thickness of 100 nm was formed on a substrate made of steel by means of a RF magnetron sputtering apparatus. The obtained film was confirmed to be calcium aluminate having a composition of $C_{12}A_7$ by the X-ray photoelectron spectrum measurement (XPS), but no distinct diffraction lines were obtained by the X-ray diffraction measurement, and thus, the film was amorphous.

Further, the sputtering time was extended, and when the sputter deposition film reached a thickness of 10 μm, the film peeled from the substrate. The peeled film was collected, and the concentrations of $O_2^-$ ion radicals and $O^-$ ion radicals were determined by measuring the ESR spectra and found to be at most $1\times10^{18}$ cm$^{-3}$, respectively.

INDUSTRIAL APPLICABILITY

According to the present invention, thermal spraying is carried out by using a calcium aluminate powder already containing oxygen radicals at a high concentration, as a starting material, whereby a calcium aluminate film containing oxygen radicals at a high concentration, can be obtained. Accordingly, an oxygen radical-containing calcium aluminate film having a large area or a complicated shape can easily be provided with high reproducibility, depending upon the particular purpose, such being industrially very useful.

In addition, according to the present invention, a laminate is provided wherein a calcium aluminate film containing oxygen radicals at a high concentration, is formed on the surface of a substrate having a desired shape and properties. Such a laminate is suitable for an application as e.g. an oxidation catalyst or an ion conductor and thus is industrially useful.

The invention claimed is:

1. A film preparation method comprising
   subjecting to thermal spraying a powder comprising an oxygen radical-containing calcium aluminate comprising powdered crystalline 12CaO.7Al$_2$O$_3$ ($C_{12}A_7$) having an oxygen radical content of at least $10^{20}$ cm$^{-3}$, where the thermal spraying melts the powder only at the surface of the powder or in the vicinity of the surface of the powder; and
   depositing the thermally sprayed powder onto a substrate as a film comprising deposited crystalline 12CaO.7Al$_2$O$_3$ ($C_{12}A_7$) having an oxygen radical content of at least $10^{20}$ cm$^{-3}$.

2. The method according to claim 1, wherein the powdered crystalline 12CaO.7Al$_2$O$_3$ ($C_{12}A_7$) is obtained by a solid phase reaction of a Ca source and an Al source in a mol ratio of Ca:Al being from 0.77:1 to 0.96:1.

3. The method according to claim 2, wherein the solid phase reaction is carried out in a dry oxidizing atmosphere having an oxygen partial pressure of at least $10^4$ Pa, a steam partial pressure of at most $10^2$ Pa and a temperature of from 1,200 to 1,415° C., or after the solid phase reaction, the system is maintained in such a dry oxidizing atmosphere.

4. The method according to any one of claims 1, 2 and 3, wherein the thermal spraying is carried out by plasma spraying.

5. The method according to claim 1, wherein the powder subjected to thermal spraying consists of the oxygen radical-containing calcium aluminate.

6. The method according to claim 5, wherein the oxygen radical-containing calcium aluminate further comprises at least one selected from the group consisting of 3CaO.Al$_2$O$_3$ ($C_3$A), CaO.Al$_2$O$_3$(CA), CaO.2Al$_2$O$_3$(CA$_2$) and CaO.6Al$_2$O$_3$(CA$_6$).

7. The method according to claim 1, wherein the oxygen radical-containing calcium aluminate further comprises at least one selected from the group consisting of 3CaO.Al$_2$O$_3$ ($C_3$A), CaO.Al$_2$O$_3$(CA), CaO.2Al$_2$O$_3$(CA$_2$) and CaO.6Al$_2$O$_3$(CA$_6$).

* * * * *